United States Patent
Schmidt

(10) Patent No.: US 7,786,887 B2
(45) Date of Patent: Aug. 31, 2010

(54) ELECTROMAGNETIC ENERGY CONVERTER

(75) Inventor: Frank Schmidt, Zorneding (DE)

(73) Assignee: EnOcean GmbH, Oberhaching (DE)

( * ) Notice: Subject to any disclaimer, the term of this patent is extended or adjusted under 35 U.S.C. 154(b) by 0 days.

(21) Appl. No.: 12/215,153

(22) Filed: Jun. 24, 2008

(65) Prior Publication Data
US 2008/0265693 A1 Oct. 30, 2008

Related U.S. Application Data

(63) Continuation of application No. 11/245,711, filed on Oct. 6, 2005, now Pat. No. 7,391,135, which is a continuation of application No. PCT/DE2004/000562, filed on Mar. 18, 2004.

(30) Foreign Application Priority Data

Apr. 7, 2003 (DE) ............................ 103 15 764

(51) Int. Cl.
*G08B 23/00* (2006.01)
*H02K 35/06* (2006.01)
*H01H 13/48* (2006.01)

(52) U.S. Cl. ............. 340/693.1; 340/693.3; 310/15; 310/21; 335/229; 290/1 R

(58) Field of Classification Search ......... 310/15.23, 310/17, 21, 23, 15; 340/870.16–870.17, 340/870.3–870.39, 693.1–693.4; 335/229–234; 290/1 R, 1 E
See application file for complete search history.

(56) References Cited

U.S. PATENT DOCUMENTS

| 3,686,520 A | 8/1972 | Campagnuolo |
| 3,693,033 A | 9/1972 | Troesh |
| 3,906,960 A | 9/1975 | Lehr |
| 3,963,948 A | 6/1976 | Bratkowski et al. |
| 3,984,707 A | 10/1976 | McClintock |
| 4,020,369 A | 4/1977 | Shoupp et al. |
| 4,220,907 A * | 9/1980 | Pappas et al. ............ 322/3 |
| 5,151,695 A | 9/1992 | De Los Santos et al. |
| 2005/0035600 A1 * | 2/2005 | Albsmeier et al. |

FOREIGN PATENT DOCUMENTS

| DE | 19818580 | 10/1999 |
| DE | 19852470 | 5/2000 |
| DE | 10011448 | 9/2000 |
| DE | 10025561 | 12/2001 |
| DE | 10125059 | 12/2002 |
| FR | 2582153 | 11/1986 |
| GB | 856607 | 12/1960 |
| WO | WO 9836395 | 8/1998 |
| WO | WO 0145123 | 6/2001 |
| WO | WO 2095908 A1 * | 11/2002 |

* cited by examiner

*Primary Examiner*—Ramon M Barrera
(74) *Attorney, Agent, or Firm*—Cohen Pontani Lieberman & Pavane LLP

(57) ABSTRACT

An autonomous-power radio device including an electromagnetic energy transducer having a permanent magnet (1), a soft-magnetic element (9), an electrical coil (6), and stop points (8a-8d). The electrical coil surrounds a part of the magnetic circuit, wherein the permanent magnet (1) and said soft-magnetic element (9) are arranged to form a magnetic circuit with a first flux direction. At least one of the soft-magnetic element (9) and the permanent magnet (1) is mounted for rotary movement about an axis (4) with respect to the other. End points of the rotary movement are formed by the stop points (8a-8d).

18 Claims, 1 Drawing Sheet

ELECTROMAGNETIC ENERGY CONVERTER

RELATED APPLICATIONS

This is a continuation of U.S. patent application Ser. No. 11/245,711 filed Oct. 6, 2005, now U.S. Pat. No. 7,391,135, which is a continuation of International Application No. PCT/DE2004/000562, filed on Mar. 18, 2004, which claims priority from German Application No. 103 15 764.6, filed Apr. 7, 2003, the contents of which are hereby incorporated by reference.

FIELD OF THE INVENTION

The invention relates to an electromagnetic energy converter, comprising at least one permanent magnet, a moving element, a soft-magnetic element and an electrical coil which surrounds at least a part of the softmagnetic element, and to the use of an electromagnetic energy converter such as this for radio switches and radio sensors and a radio device coupled to the electromagnetic energy converter.

BACKGROUND OF THE INVENTION

Electromagnetic converters are known in many embodiments, for example as generators. The power supply for electrical or electronic circuits, in particular very small circuits or small electrical circuits in small and very small appliances or control elements, such as radio switches or radio sensors, is frequently formed by battery power and/or solar energy, rechargeable batteries or the like. One disadvantage of this way of supplying power to small or miniaturized circuits or small components is that the energy supplier, e.g., the battery or the rechargeable battery, often occupies a large amount of space which the actual electronic circuit occupies, thus destroying the space advantage obtained by miniaturization. This also applies to the use of solar cells for supplying electrical power to circuits such as these. The size of the solar cells is many times greater than the size of the electronic circuit thus, in this case as well, destroying the space advantage obtained by miniaturization, and often the weight advantage as well. A further significant disadvantage of a power supply such as this is that, particularly when these systems are equipped with a power supply with battery or rechargeable battery backup, they are not maintenance-free. This is because, in particular, batteries and rechargeable batteries are subject to ageing, and must be replaced at predetermined time intervals. For example, a radio switch, such as that which is known as a control element for a radio-controlled motor vehicle locking system, contains a power supply in the form of a rechargeable battery or a battery in addition to its electronic components, which form the radio technology and a switching contact. The switch and the rechargeable battery may actually be those components which occupy the greatest amount of space in this small appliance. The proportion of the weight of these two components may also be considerably greater than that of the electronic circuit. Furthermore, the rechargeable battery must store energy during the time in which the radio switch is not being used as well, which energy is not required at this time and is kept available as stored energy.

SUMMARY OF THE INVENTION

One object of the invention is to provide a system which optimizes or reduces the space required for the components mentioned above, and for applications mentioned by way of example.

This and other objects are attained in accordance with one aspect of the present invention directed to an electromagnetic energy transducer comprising a permanent magnet, a soft-magnetic element, an electrical coil, and stop points (8a-8d). The electrical coil surrounds a part of the magnetic circuit, wherein the permanent magnet and the soft-magnetic element are arranged to form a magnetic circuit with a first flux direction. At least one of the soft-magnetic element and the permanent magnet is mounted for rotary movement about an axis with respect to the other. End points of the rotary movement are formed by the stop points.

In accordance with an embodiment of the invention, the magnetic circuit is not opened or closed in a slowly rising continuous form, but in principle suddenly, in a similar manner to the closing or opening of a switch. This sudden change results in a likewise sudden change in the magnetic flux, which induces an electric current in the coil. This electric current is then used to supply power to a downstream electronic circuit, for example to that of a radio switch for motor vehicle locking systems.

In one advantageous embodiment, the moving element is preferably formed from a soft-magnetic core, and is held in a first or a second rest position by magnetic latching forces. The first or second rest position may in this case be either the open state or the closed state of the magnetic circuit. In this case, it is irrelevant from which initial position or which of the two positions the so-called rest position assumes, since the change in the magnetic flux always induces an electric current, irrespective of its direction. One advantage is that the polarity of the electric current differs depending on whether it has been induced by closing or by opening of the electromagnetic circuit. This additional information can be applied to the subsequent radio signal, thus making it possible to provide additional functionalities.

In a further advantageous embodiment, the moving element has a spring element added to it in such a way that one of the two positions which can be assumed by the moving element represents a stable position, for example a first rest position. On operation, the moving element is then moved against a spring force until, for example, the magnetic circuit is opened or closed, and when the moving element is released, the spring force forces it back again to the original rest position, once again leading to the opening or closing of the magnetic circuit. This advantageously results in electric current being induced twice, in each case on opening and on closing, and this electric current can be used as supply energy in the downstream electronic circuit. The simple addition of the spring element doubles the amount of electrical energy produced by the electromagnetic energy converter.

In addition, in one advantageous embodiment, the moving element is equipped with a dead-center mechanism in conjunction with the spring element, that is to say the moving element moves to the second rest position automatically and without any further force being applied by the operator after passing through a dead-center position, so that, irrespective of the speed at which an operator moves the moving element until it passes over the dead-center position, the intensity of the movement after passing over the dead-center position is always the same, so that the intensity of the induced electrical energy is also always the same and is thus optimized on a system-immanent basis, and is independent of the user.

It is also advantageous to physically combine the moving element and the spring element and, furthermore, to form the magnetic cirduit from two concentric rings and to connect it via a circular base plate, so that that face of the concentric rings which is opposite the base plate forms a magnetic north pole and a magnetic south pole. Particularly in the case of this embodiment, it is also advantageous to stress the moving element in a physical unit with a spring element like a dome over the concentric rings, and thus to form a circular energy converter. When the spring element is pressed, centrally in the dome-like shape, the dome will snap over like a spring on reaching the dead-center position, and will then close the electromagnetic circuit and open it again in the manner just described.

In one advantageous embodiment, one of the concentric rings is optionally connected to the spring element in such a way that it is moved with the spring element. In order to ensure that electrical energy is also induced via the sudden change in the magnetic flux, the electric coil is moved relative to a permanent magnet. The magnetic circuit is closed or opened at the start or at the end of a movement such as this. This increases the yield of electrical energy.

In one advantageous embodiment, the two concentric circuits and the electromagnetic energy converter are matched to the size of a button cell battery. Based on the principle described above, the energy converter produces energy exactly when this is also required to carry out an action. An energy converter such as this can be referred to as an action-related energy converter. There is therefore no need for space-consuming storage of electrical energy. There is no need for any additional switching element either, since this is formed in the functional unit with the energy converter. Since the energy converter according to the invention can also be matched to a miniaturized form in the form and nature of a button cell battery, the options for use are virtually unlimited. Only the use for supplying power to radio switches is mentioned here, by way of example.

The energy converter can preferably be designed to be even smaller than a button cell battery, and in any case to have a diameter of less than 1.5 cm. An energy converter such as this is particularly suitable, for example, for the use of radio switches.

A user operates an energy converter of the size of a button, in which mechanical energy is converted to electrical energy by pressing the energy converter, with the magnetic circuit being closed. The electrical energy which is induced in this way is used immediately in an electronic circuit for transmission of a radio signal, and in consequence this radio signal triggers an action at a radio receiver, or in appliances which are connected to it. One example which may be mentioned is the locking system for a motor vehicle.

DETAILED DESCRIPTION OF THE DRAWINGS

Figure 1:
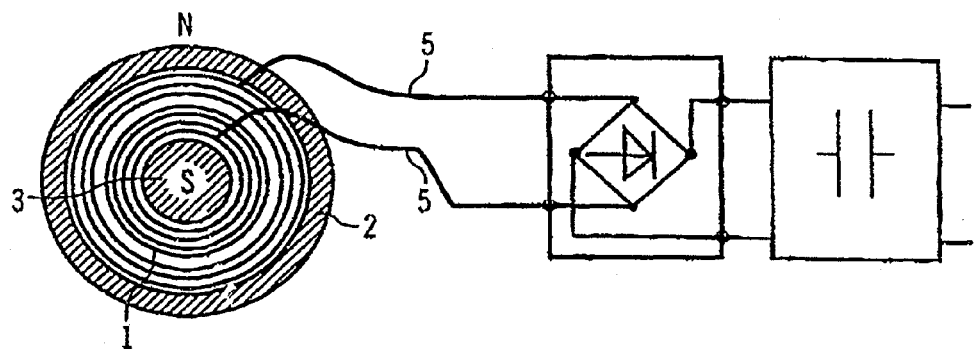
FIG. 1 shows a plan view of an electromagnetic energy converter, and a coil.
Figure 1:
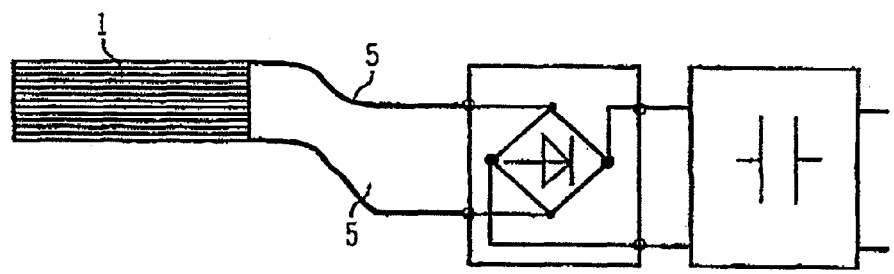

The illustration in FIG. 1 shows a plan view of one exemplary embodiment of the electromagnetic energy converter, in which an electrical coil 1 is embedded between two concentric circles, formed from a permanent magnet 2. One of the two concentric circles is in this case that part 3 of the magnetic circuit which is surrounded by the coil. The coil is provided with electrical connections 5, which are used to pass on to a load 8 the electric current which is induced in the coil. By way of example, the autonomous-power switch which is illustrated schematically in FIG. 2 is in the form of an electronic circuit.

Figure 2:
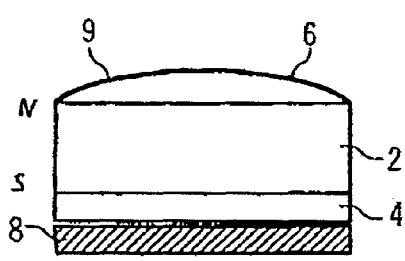
FIG. 2 shows an electromagnetic energy converter in a state in which the magnetic circuit is open and in a state in which the magnetic circuit is closed.
Figure 2:
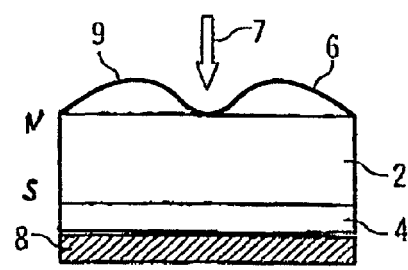

FIG. 2 shows a side view of the electromagnetic converter shown in FIG. 1, having a circular base plate 4, which connects permanent magnets 2 (which are in the form of concentric rings) to one another. In FIG. 2, the spring element and the moving element are formed in one physical unit which snaps over after a force 7 is exerted, in the form of a snapper, thus closing the magnetic circuit.

Autonomous-power radio switches and radio sensors can be operated briefly without an energy store by providing energy by manual or some other type of mechanical operation and converting this to usable electrical energy by means of a converter operating on the electromagnetic principle.

One particularly advantageous exemplary embodiment of the energy converter allows, a highly miniaturized form to be provided, energy to be converted when force is applied and additionally when the force is removed, conversion of a minimum amount of energy, irrespective of the operating speed, a plurality of different switching commands to be produced, by means of only one energy converter.

FIG. 1 and FIG. 2 show one such exemplary embodiment of the energy converter. A permanent magnet 2 is located in a magnetic circuit composed of soft-magnetic material such as iron, ferrite or transformer laminates 3, 4. This has a moving element 6, which in this case is advantageously in the form of a physical unit as a moving spring element with a dead-center mechanism. Such an element can include a kind of snap mechanism made out of a steel plate formed in the shape of a dome. Such mechanisms are well known to a person with ordinary skill in the art and, therefore, further details thereof are not deemed necessary. This mechanism quickly connects two magnetically different poles as soon as the force 7 that is exerted exceeds a predetermined value. When this occurs, a magnetically highly permeable circuit is closed, which was previously kept open by an air gap. This results in a rapid change in the magnetic flux passing around the coil 1. This change leads to induction of a voltage, which is tapped off at the electrical connections 5 and can be used to briefly supply radio electronics.

Thus, if force 7 is exerted on this element 6, the supplied energy is stored by slight deformation until a dead-center point is reached. On passing beyond this dead-center point, the spring snaps relatively rapidly to the second position, which can also be an unstable position, in which it closes the magnetic circuit either itself or via an additional magnetically permeable part. This snapping action takes place even if the operating force is increased slowly at a minimum speed, which can be set by the design of the magnetic circuit. This ensure that enough power is converted to operate the radio sensor/radio switch even when operated slowly. When the operating force 7 is removed, the reverse occurs: the magnetic circuit is suddenly interrupted rapidly, as soon as the dead-center point is reached, and the spring element or the moving element snaps back to its stable rest position. Power is thus produced both when pressing and when releasing the energy converter.

The magnetic flux through part 3 of the magnetic circuit around which the coil 1 is wound changes its intensity when the magnetic circuit closes or opens. This rapid magnetic flux change leads to brief voltage induction in the coil, and the electric energy produced in this way can be rectified by means of rectifiers, preferably semiconductor metal-contact diodes and, after temporary storage in a capacitor, can be used to briefly operate a radio switch or radio sensor. It is also feasible to use a plurality of coils and not to rectify the energy, because the rectification process produces high losses, particularly at low voltages. More specifically, for each operation mode at least one coil is arranged to produce a voltage of the same polarity as the other coils produce for the other operation mode.

The polarity of the voltage that is produced changes with the nature of the operation. This polarity can be measured by the connected electronic circuit, and the information contained in it about the direction of the state change can be transmitted with the radio signal that is to be transmitted.

The mechanism which acts on the moving part of the energy converter has at least one operating device, for example a key surface. A plurality of operating devices can also act in the same way on one energy converter when the aim is to provide radio switches having a plurality of channels. In this case, a suitable number of sensors, for example one sensor per operating device, are used to ensure that the respectively activated operating device is determined by the connected electronics. The information is then incorporated in the radio message to be transmitted. The connected radio electronics are preferably connected to the energy converter to form a compact, miniaturized unit.

By way of example, the magnetic circuit is designed in such a way that:

operation of the moving part leads to opening or closing of the magnetic circuit by a spring or some other moving magnetically permeable component, the use of a dead-point mechanism with at least one spring element 9 defines two states which change rapidly on operation, this spring element is used to make one of the two states unstable, so that the moving part of the magnetic circuit snaps back automatically after operation as soon as the applied force falls below a physically predetermined value, by means of which a momentary-contact switch can be produced which converts energy when it is pressed and when it is released.

The radio transmitter which can be operated by the energy converter has at least one operating device which acts mechanically on the energy converter. If it has a plurality of operating devices, these all act on the one energy converter and, in addition, on a suitable number of sensors for detection of the respectively activated operating device. The information about the identity of the operating device can thus be incorporated in the radio signal to be transmitted.

The information about the nature of operation (pressing or releasing in the case of momentary-contact switches or pressing on different operating surfaces in the case of toggle switches) can be sensed from the polarity of the voltage that is produced, and can likewise be transmitted with the radio signal.

The radio electronics for transmission of the switching information can preferably be combined with the energy converter to form a physically miniaturized, compact unit.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

I claim:

1. An autonomous-power radio device, which is physically coupled to an electromagnetic energy converter to provide electric current to an autonomous-power radio switch or autonomous-power radio sensor,
   wherein the electromagnetic energy converter comprises:
   a permanent magnet,
   a moving element,
   a soft-magnetic element, and
   an electric coil that surrounds at least a part of the soft-magnetic element,
   wherein said moving element is adapted so that any movement of the moving element from a first rest position or from a second rest position leads to opening or to closing of a magnetic circuit which is formed by the permanent magnet and the soft-magnetic element,
   wherein the autonomous-power radio switch or autonomous-power radio sensor is combined physically with the energy converter to form a compact unit configured to produce a radio signal, and
   wherein said moving element comprises a spring element that makes the second rest position unstable, so that the moving element returns to the first rest position after a movement to the second rest position.

2. The autonomous-power radio device of claim 1, wherein a polarity of the electric current is applied to the radio signal as an additional information.

3. The autonomous-power radio device of claim 2, wherein the polarity of the electric current is based on whether the electric current has been induced by opening or by closing of the magnetic circuit which is formed by the permanent magnet and the moving element.

4. The autonomous-power radio device of claim 1, further comprising a plurality of operating devices to act with the electromagnetic energy converter to provide an autonomous-power radio switch or autonomous-power radio sensor having a plurality of channels.

5. The autonomous-power radio device of claim 4, wherein a suitable number of sensors are used to ensure that the activated operating device is determined by an electronic device including the autonomous-power radio switch or autonomous-power radio sensor.

6. The autonomous-power radio device of claim 1, wherein the moving element comprises a soft-magnetic material.

7. The autonomous-power radio device as claimed in claim 6, wherein the soft-magnetic material is at least one of iron, ferrite or a nickel/iron alloy, or so-called electrical transformer laminate.

8. The autonomous-power radio device as claimed in claim 1, wherein the moving element is held in the first or the second rest position by magnetic latching forces.

9. The autonomous-power radio device of claim 1, wherein the moving element has a dead-center mechanism, which results in opening or closing of the magnetic circuit as soon as a predetermined force acting to the moving element is exceeded.

10. The autonomous-power radio device of claim 1, wherein the autonomous-powered radio device is a switch or a sensor.

11. The autonomous-power radio device of claim 1, wherein a discontinuity in the magnetic circuit is formed by an air gap.

12. The autonomous-power radio device of claim 1, wherein the electromagnetic energy converter has a diameter less than or equal to 1.5 cm.

13. The autonomous-power radio device of claim 1, wherein an autonomous-power radio switch is supplied with electrical power by the electromagnetic energy converter.

14. The autonomous-power radio device of claim 1, wherein the electric current is rectified by rectifiers.

15. The autonomous-power radio device of claim 14, wherein the rectifiers are semiconductor metal-contact diodes.

16. The autonomous-power radio device of claim 1, wherein the electrical charge is stored in a capacitor.

17. An autonomous-power radio device, which is physically coupled to an electromagnetic energy converter to provide electric current to an autonomous-power radio switch or autonomous-power radio sensor,
   wherein the electromagnetic energy converter comprises:
   a permanent magnet,
   a moving element,
   a soft-magnetic element, and
   an electric coil that surrounds at least a part of the soft-magnetic element,
   wherein said moving element is adapted so that any movement of the moving element from a first rest position or from a second rest position leads to opening or to closing of a magnetic circuit which is formed by the permanent magnet and the soft-magnetic element,
   wherein the autonomous-power radio switch or autonomous-power radio sensor is combined physically with the energy converter to form a compact unit configured to produce a radio signal,
   wherein the moving element has a dead-center mechanism, which results in opening or closing of the magnetic circuit as soon as a predetermined force acting to the moving element is exceeded,
   wherein the moving element consists of a spring element, and
   wherein the permanent magnet is a concentric ring that concentrically surrounds the soft-magnetic element.

18. The autonomous-power radio device of claim 17, wherein the spring is a dome over the concentric ring and the soft-magnetic element.

* * * * *